(12) United States Patent
Nagai

(10) Patent No.: US 10,797,961 B2
(45) Date of Patent: Oct. 6, 2020

(54) DEVICE SEARCH APPARATUS AND DEVICE SEARCH METHOD

(71) Applicant: SEIKO EPSON CORPORATION, Tokyo (JP)

(72) Inventor: Kazuki Nagai, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/199,592

(22) Filed: Nov. 26, 2018

(65) Prior Publication Data

US 2019/0166012 A1    May 30, 2019

(30) Foreign Application Priority Data

Nov. 27, 2017  (JP) ................. 2017-226533

(51) Int. Cl.
*H04L 12/24* (2006.01)
*G06F 3/0481* (2013.01)
*H04L 29/08* (2006.01)
*G06F 16/9032* (2019.01)
*G06F 16/9038* (2019.01)
*H04W 8/00* (2009.01)

(52) U.S. Cl.
CPC .......... *H04L 41/22* (2013.01); *G06F 3/04812* (2013.01); *G06F 16/9038* (2019.01); *G06F 16/90332* (2019.01); *H04L 41/0853* (2013.01); *H04L 67/02* (2013.01); *H04W 8/005* (2013.01)

(58) Field of Classification Search
CPC ...................................................... G06F 16/29
See application file for complete search history.

(56) References Cited

U.S. PATENT DOCUMENTS 9,690,804 B2 * 6/2017 Masuko ................ G06F 16/29
2012/0252412 A1 * 10/2012 Kimura ................ H04L 63/08
455/411

FOREIGN PATENT DOCUMENTS

| EP | 1463237 A1 | 9/2004 |
| JP | 2004-110587 A | 4/2004 |
| JP | 2004-302561 A | 10/2004 |
| JP | 2009-73588 A | 4/2009 |

* cited by examiner

*Primary Examiner* — Cao H Nguyen
(74) *Attorney, Agent, or Firm* — Oliff PLC

(57) ABSTRACT

A device search apparatus includes: a communication device which wirelessly communicates with a device; an input device to which information is inputted; a display device which displays information; and a processing device which, if input information including a predetermined keyword is received via the input device, searches for a device, using the communication device, extracts a device associated with a device name included in the input information from among the devices detected by the search, and displays a device indication representing each of the extracted devices on the display device.

7 Claims, 5 Drawing Sheets

DEVICE SEARCH APPARATUS AND DEVICE SEARCH METHOD

BACKGROUND

1. Technical Field

The present invention relates to a device search apparatus and a device search method.

2. Related Art

Network devices that can connect to a PC (personal computer), smartphone or the like via wireless communication use various wireless systems such as Wi-Fi (trademark registered) and Bluetooth (trademark registered), depending on the model of the network devices. The method for searching for a device at the time of connection for communication and the protocol to establish communication vary according to each wireless system.

For example, a user first must cause a PC or the like to recognize devices on the periphery that use the communication system of a desired device. The user then must specify a desired device from among a plurality of devices recognized and displayed on a display device of the PC or the like. After specifying the desired device, the user needs to establish connection for communication between the PC or the like and the desired device in conformity with the protocol of the communication system.

To follow such procedures to establish communication, the user needs to have a certain level of knowledge about IT devices (IT literacy). A user with a low IT literacy level may find the procedures very difficult. Thus, a technology is demanded that can easily establish connection for communication between a PC or the like and a desired device so that even a user with a low IT literacy level can execute procedures for connection.

Meanwhile, as a system for detecting the location of a desired target object, a system is known in which a wireless tag with ID information written is attached to each target object and in which a plurality of search devices capable of communicating with the wireless tag is distributed (JP-A-2009-73588). In this system, the ID information of the wireless tag attached to a target object and location information of a search device that can communicate with the wireless tag are stored in association with each other in a search control device. The location of a desired target object is specified, based on the location information of the search device associated with the ID information of the wireless tag of the target object.

However, the related-art system, which detects the physical position of a desired target object from among target objects distributed in various places, does not provide any solution to easily establish connection for communication between a PC or the like and a device on the periphery.

SUMMARY

An advantage of some aspects of the invention is that even a user with a low IT literacy level can easily connect to a wireless network device.

A device search apparatus according to an aspect of the invention includes: a communication device which wirelessly communicates with a device; an input device to which information is inputted; a display device which displays information; and a processing device which, if input information including a predetermined keyword is received via the input device, searches for a device, using the communication device, extracts a device associated with a device name included in the input information from among the devices detected by the search, and displays a device indication representing each of the extracted devices on the display device.

This configuration enables the user to narrow down and easily specify a desired device with which to establish wireless connection for communication, from among devices existing on the periphery of the device search apparatus on the display device. Therefore, even a user with a low IT literacy level can easily connect to a desired wireless network device.

In another aspect of the invention, in the device search apparatus, the communication device has a function of wirelessly communicating by a plurality of different communication systems, and the processing device displays, on the display device, the device indication including an indication of a communication system used for communication with the extracted device.

This configuration enables the user to use, as a clue, the indication of communication system included in the device indication, and thus easily narrow down the device with which to establish connection for communication, from among the device indications displayed on the display device.

In another aspect of the invention, in the device search apparatus, the processing device acquires device information representing a model of the extracted device from the extracted device, acquires an image of a device of the model specified by the acquired device information from an information source on a network, and displays the device indication including the acquired image on the display device.

This configuration enables the user to more easily narrow down the device with which to establish connection for communication, from among the device indications displayed on the display device based on the image included in the device indication.

In another aspect of the invention, in the device search apparatus, when one of the device indications of the extracted devices is selected on a display screen of the display device, the processing device instructs the device corresponding to the selected device indication to issue a signal that can be identified by a user.

This configuration can clarify the correspondence between the device indication and the actual device. Thus, the user can easily specify the device with which to establish connection for communication, from among the device indications displayed on the display device.

In another aspect of the invention, in the device search apparatus, the processing device displays, on the display device, a web browser for a user to search for information from the information source on the network via the communication device, and displays the device indication on the display device along with the information searched for from the information source on the network with respect to a device name included in the input information.

This configuration enables the user to easily narrow down the device with which to establish connection for communication, from among the display indications displayed on the display device, also with reference to the information searched for from the information source on the network with respect to the device with which to establish connection for communication.

In another aspect of the invention, in the device search apparatus, when an input to the effect that selection of one of the device indications is decided is received via the input device, the processing device starts a connection sequence to connect for communication with the device corresponding to the device indication whose selection is decided.

With this configuration, a simple operation of deciding selection of a device indication (for example, a click on the device indication, or the like) enables easily executing the decision of the device with which to establish connection for communication and the subsequent execution of the connection sequence to establish communication, as a series of processes.

A device search method according to another aspect of the invention is executed by a device search apparatus. The method includes: receiving information including a predetermined keyword, searching for a device, extracting a device associated with a device name included in the received information from among the devices detected by the search, and displaying a device indication representing each of the extracted devices on the display device.

This configuration enables the user to narrow down and easily specify a desired device with which to establish wireless connection for communication, from among devices existing on the periphery of the device search apparatus. Therefore, even a user with a low IT literacy level can easily connect to a desired wireless network device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the drawings.

Figure 1:
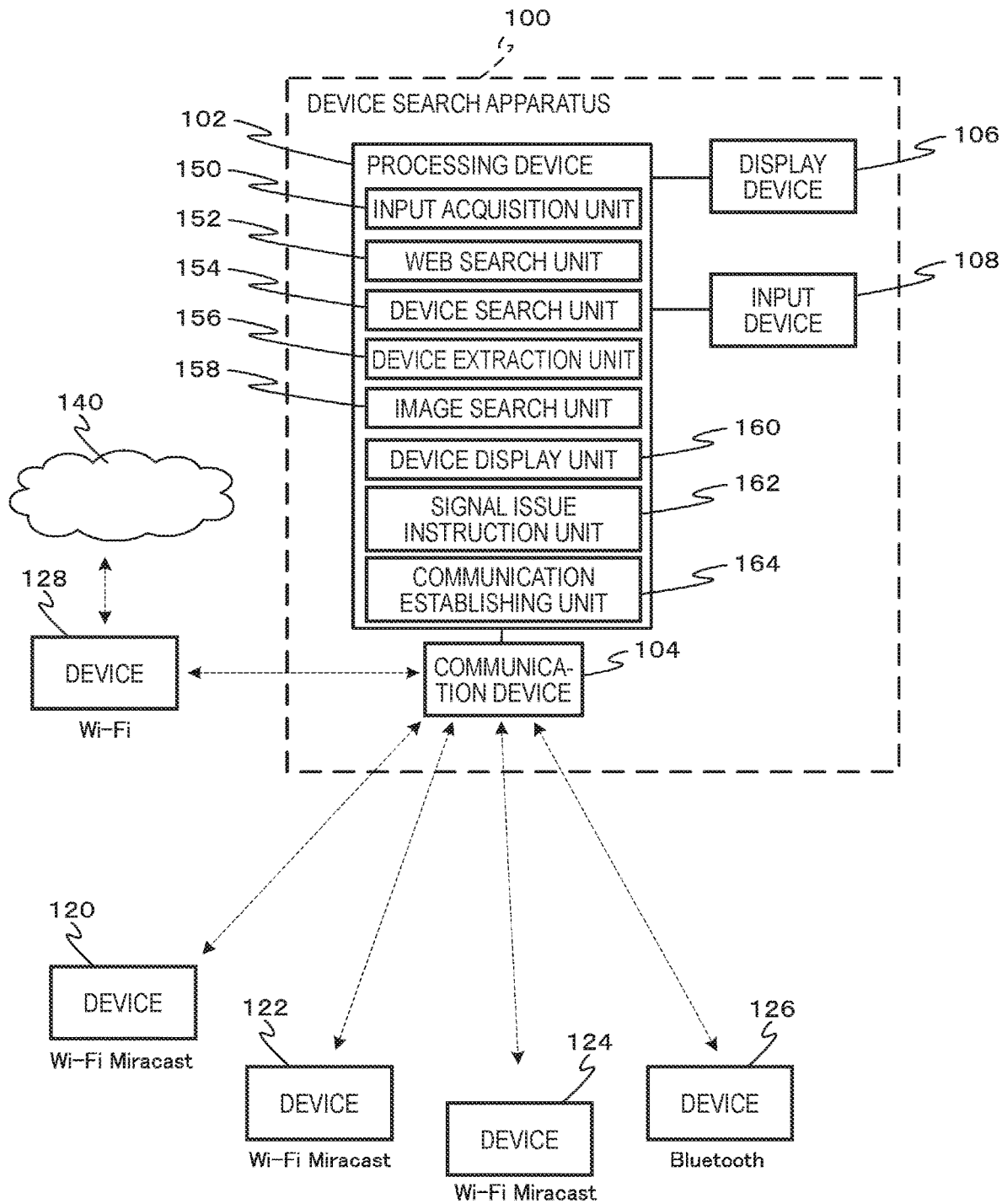
FIG. 1 shows an example of a device search apparatus according to an embodiment of the invention.

FIG. 1 shows an example of a device search apparatus 100 according to an embodiment of the invention. The device search apparatus 100 is, for example, a laptop PC (personal computer) but not limited to this. For example, the device search apparatus 100 can also be an arbitrary apparatus that can be connected to a wireless network, such as a portable terminal device like a smartphone or tablet PC.

The device search apparatus 100 has a processing device 102, a communication device 104, a display device 106, and an input device 108. The communication device 104 has the function of wirelessly communicating by a plurality of different communication systems. The communication device 104 communicates with a device on the periphery of the device search apparatus 100, for example, devices 120, 122, 124, 126, 128, using one of the plurality of communication systems. In this embodiment, the communication device 104 has the function of wirelessly communicating by three communication systems conforming to the Wi-Fi, Wi-Fi Direct (trademark registered), and Bluetooth standards.

In the illustrated example, the devices 120, 122, 124 are, for example, wireless reception terminals conforming to the Wi-Fi Miracast (trademark registered) standard. The devices 120, 122 are projectors. The device 124 is a monitor. The communication device 104 communicates with the devices 120 to 124, for example, using a communication system conforming to the Wi-Fi Direct standard.

The device 126 is, for example, a speaker which is a wireless reception terminal conforming to the Bluetooth standard. The communication device 104 communicates with the device 126, using a communication system conforming to the Bluetooth standard. The communication device 104 also communicates with the device 128 functioning as an access point to the internet 140, for example, in conformity with the Wi-Fi standard.

The above description of the devices 120 to 128 is an example. The devices 120 to 128 may have other functions than projector, speaker and the like, and may be devices which communicate, using other wireless communication standards than the above. An arbitrary number of devices can be connected via the communication device 104. Also, the communication device 104 can have the function of wirelessly communicating, using an arbitrary number of various communication systems, in addition to or instead of the above communication systems.

In the description below, to avoid complicating the description and facilitate understanding, it is assumed that communication between the device 128 as an access point and the device search apparatus 100 via the communication device 104 is established in advance. Therefore, hereinafter, any description about the use of the internet 140 means that the internet 140 is accessed from the communication device 104 via the device 128. Also, any description about the use of the world wide web means that the world wide web on the internet 140 accessed from the communication device 104 via the device 128 is used.

The display device 106 is, for example, a liquid crystal display device. The input device 108 includes a pointing device such as a mouse, or a keyboard, and is used by the user to input data and/or instructions to the device search apparatus 100. Alternatively, the display device 106 may be formed as a touch panel including a touch pad arranged on a liquid crystal display device, and the input device 108 may be formed as the touch pad.

The processing device 102 is, for example, a computer having a processor such as a CPU (central processing unit). The processing device 102 may also include a ROM (read only memory) in which a program is written, and a RAM (random access memory) or the like for temporarily storing data. The processing device 102 has, as functional elements (or functional units), an input acquisition unit 150, a web search unit 152, a device search unit 154, a device extraction unit 156, an image search unit 158, a device display unit 160, a signal issue instruction unit 162, and a communication establishing unit 164.

These functional elements of the processing device 102 are implemented, for example, by the processing device 102 as a computer executing a program. The computer program can be stored in an arbitrary computer-readable storage medium.

Alternatively, all or a part of the functional elements of the processing device 102 can be configured each by hardware including one or more electronic circuit components.

The input acquisition unit 150 acquires information (input information) inputted via the input device 108. The input device 108 receives information in response to user's operation. For example, when a web browser is displayed on the display device 106 by the web search unit 152, described later, the input acquisition unit 150 acquires input information inputted to the input device 108 via the web browser.

The web search unit 152 displays, on the display device 106, a web browser for the user to search the world wide web on the internet 140 to find information via the communication device 104. The web search unit 152 acquires input information inputted to the web browser, from the input acquisition unit 150, then searches the world wide web to find information and image associated with the input information, and displays the result of the search on the display device 106. The search on the world wide web based on the input information and the display of the result of the search by the web search unit 152 are carried out independently of operations by the device search unit 154 such as search, detection, and display of a network device, described later.

The worldwide web is an example. The web search unit 152 can search for information and image associated with the input information from an arbitrary information source (for example, a server) on an arbitrary network that can be connected via the communication device 104.

Next, operations of the device search unit 154, the device extraction unit 156, the image search unit 158, the device display unit 160, the signal issue instruction unit 162, and the communication establishing unit 164 will be described. These operations are implemented, for example, as operation of an add-in program of the web browser displayed on the display device 106 by the web search unit 152.

The device search unit 154 searches for a device existing on the periphery of the device search apparatus 100 (that is, existing within a range where communication is available), using the communication device 104, if the input acquisition unit 150 has received input information including a predetermined keyword via the input device 108.

That is, the device search unit 154 broadcasts a response request to an arbitrary device, using each of all of the communication systems with which the communication device 104 can operate. In this embodiment, the device search unit 154 sequentially broadcasts a response request, for example, using each of the communication systems of Wi-Fi, Wi-Fi Direct, and Bluetooth.

Thus, the device search unit 154 searches for the devices 120 to 128 existing on the periphery of the device search apparatus 100 (that is, existing within a range where communication is available). Here, the predetermined keyword can be a specific term such as "peripheral search" or a specific character string such as alphanumeric symbols.

If input information including a predetermined keyword is inputted to the input device 108, information associated with the predetermined keyword can also be searched for on the web browser. Therefore, if input information acquired from the input device 108 includes a predetermined keyword, the input acquisition unit 150 can provide the input information excluding the predetermined keyword to the web search unit 152. Thus, the web search unit 152 can search the world wide web for information associated with the input information excluding the predetermined keyword, without being influenced by the predetermined keyword.

In response to the response request broadcast by the device search unit 154, each of the devices 120 to 128 transmits response information. The response information includes device identification information (for example, MAC address) of a device that is the transmission source of the response information. The response information can also include information of the type of the function of the device (function type; for example, information such as "projector" or "speaker") and/or information of the model of the device (for example, information of model number).

The device search unit 154 receives the response information and thus detects the device transmitting the response information, as a device existing around the device search apparatus. The detection of a device by the device search unit 154 is not limited to the above technique and can also be carried out, for example, in conformity with the Wi-Fi Aware (trademark registered) standard.

Based on the information of the function type included in the response information received from each of the devices 120 to 128, the device extraction unit 156 extracts a device corresponding to the device name included in the input information, from among the devices detected by the device search unit 154. For example, if the input information includes a text representing a device name "projector", the device extraction unit 156 extracts the devices 120, 122, which are projectors, from among the devices 120 to 128 detected by the device search unit 154.

If the input information includes no device name, the device extraction unit 156 extracts, for example, all of the devices detected by the device search unit 154.

If the response information received from the extracted devices 120, 122 includes information representing the model of the devices (for example, model number), the image search unit 158 searches the world wide web via the communication device 104 to acquire an image of a device of that model. The source from which the image is acquired is not limited to the world wide web and can be an arbitrary information source (for example, a server) on an arbitrary network connected via the communication device 104.

The device display unit 160 displays, on the display device 106, a device indication representing each device extracted by the device extraction unit 156. At this point, the device display unit 160 acquires from the device search unit 154 information of the communication system used by the communication device 104 for communication with a device corresponding to each of the device indications, and includes an indication of the communication system represented by the acquired information, in the corresponding device indication.

If the image search unit 158 has successfully acquired an image of a device, the device display unit 160 causes the acquired image to be included in the device indication about this device and causes the device indication to be displayed on the display device 106. Meanwhile, for a device which the image search unit 158 cannot acquire an image of, the device display unit 160 can include and display, for example, a preset icon corresponding to the function type of the device, in the device indication of the device.

When displaying a device indication on the display device 106, the device display unit 160 displays the device indication on the display device 106, along with a screen showing the result of search for input information displayed on the display device 106 by the web search unit 152. For example, the device display unit 160 notifies the web search unit 152 to divide the display area of the result of search on the web browser into two panes (display areas) and display the result of search on one pane, and displays the device indication on the other pane.

When displaying the device indication on the other pane, the device display unit 160 can display the device indication, for example, in order from the device information of the device from which response information with the highest radio wave intensity is received.

When one of the device indications is selected on the display screen of the display device 106, the signal issue instruction unit 162 instructs the device corresponding to the selected device indication to issue a signal (identification signal) that can be identified by the user. The selection of a device indication can be carried out by an arbitrary operation by the user. For example, putting a cursor on one of the device indications on the display screen of the display device 106 can carry out the selection of a device indication.

Alternatively, if the device search apparatus 100 is a portable terminal device such as a smartphone having the display device 106 including a touch screen, the selection of a device indication can be carried out, for example, by a long press (long touch) with a finger on the device indication.

The instruction to issue the identification signal by the signal issue instruction unit 162 can be carried out, more specifically, by transmitting a signal issue command that instructs the device corresponding to the selected device indication (for example, on which a cursor is put) to issue the identification signal. It is preferable that the device, having received the signal issue command, continues issuing the identification signal until it receives a signal stop command that instructs the device to stop issuing the identification signal. It is desirable that the signal issue command and the signal stop command are, for example, defined commonly at each respective device in advance.

The identification signal issued by a device can be, for example, an acoustic signal such as a beep, a visual signal such as lighting, flashing or change in the lighting color of a lamp provided in the device, and/or an acoustic or tactile signal such as vibration of the casing of the device.

If an input to the effect that the selection of one of the device indications displayed on the display device 106 is decided is received via the input device 108, the communication establishing unit 164 starts a connection sequence to connect for communication with the device corresponding to the device indication whose selection is decided. Here, the input to the effect that one of the device indications is selected can be carried out by an arbitrary operation by the user. For example, a click on one of the device indications by the user using a mouse that forms the input device 108 can carry out an input to the effect that the device indication is selected.

In addition to or instead of this, a number may be given to each device indication on the screen of the display device 106 and the user may input the number of a device indication via the input device 108, thus carrying out an input to the effect that the selection of the device indication is decided. Alternatively, if the device search apparatus 100 is, for example, a portable terminal device such as a smartphone having the display device 106 including a touch screen, the decision on the selection of a device indication can be carried out, for example, by a tap on the device indication with a finger.

Figure 2:
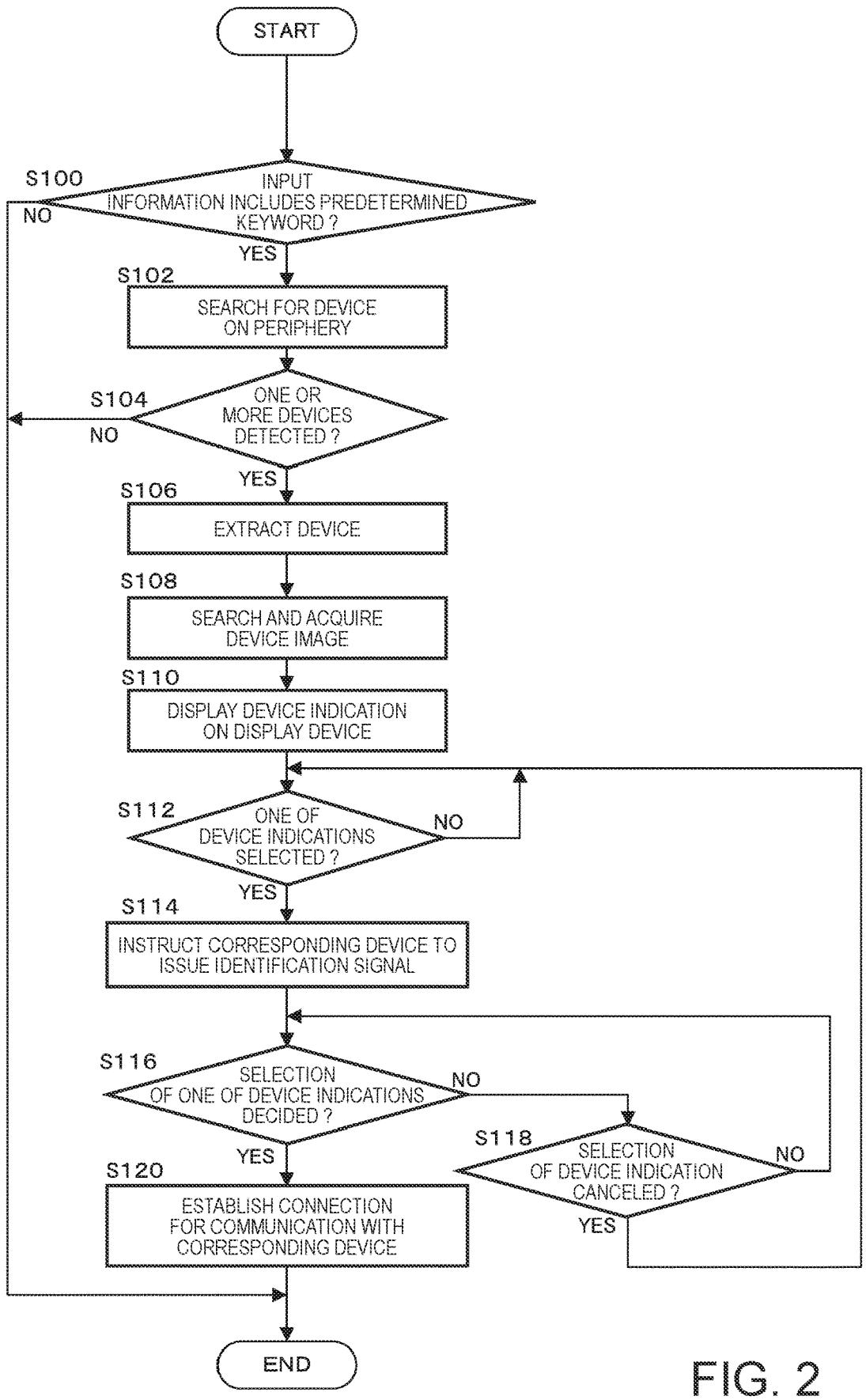
FIG. 2 is a flowchart showing processing by the device search apparatus.

Next, procedures of device search processing carried out by the processing device 102 will be described with reference to a flowchart shown in FIG. 2. This processing starts when certain input information is inputted via the input device 108. The input information is acquired by the input acquisition unit 150, for example, as text information inputted by the user via the input device 108 into a search word input box on a web browser displayed on the display device 106 by the web search unit 152.

As the processing starts, the device search unit 154 determines whether input information includes a predetermined keyword or not (step S100). If the input information does not the predetermined keyword (NO in step S100), the device search unit 154 ends the processing. Meanwhile, if the input information includes the predetermined keyword (YES in step S100), the device search unit 154 searches for a device existing on the periphery of the device search apparatus 100, using the communication device 104 (step S102). This search is carried out by broadcasting a response request to an arbitrary device, sequentially using all of the communication systems with which the communication device 104 can operate. Then, a device transmitting response information in response to the response request is specified. A device existing on the periphery is thus detected.

Next, the device search unit 154 determines whether at least one device is detected by the search or not (step S104). If no device is detected (NO in step S104), the device search unit 154 ends the processing. Meanwhile, if at least one device is detected (YES in step S104), the device extraction unit 156 extracts a device associated with a device name included in the input information (that is, a device belonging to the type indicated by the device name), from the detected device (step S106). This extraction can be carried out, based on information of the function type of the device included in the response information from each device. If the function type of the detected device cannot be determined, the device extraction unit 156 extracts the device as a device associated with the device name included in the input information.

Then, if the response information of the extracted device includes information about the model of the device, for example, a model number, the image search unit 158 searches the world wide web or the like, using the model number as a key, and thus acquires an image of a device of the model number (step S108). Next, the device display unit 160 displays a device indication representing the extracted device, on the display device 106 (step S110). The device indication includes, for example, device identification information (for example, MAC address) included in the response information of the corresponding device. If the response information includes information of a device type, the device indication also includes the information of the device type. The device display unit 160 asks the device search unit 154 about the communication system used for communication with the extracted device, and includes information representing the communication system in the device indication corresponding to the device. Also, if an image is acquired by the image search unit 158 from the worldwide web or the like, based on the model number of the device, of the extracted devices, the device display unit 160 includes the image in the device indication of the corresponding device.

As described above, when displaying a device indication on the display device 106, the device display unit 160 displays the device indication on the display device 106, along with a screen showing the result of the search based on the world wide web or the like displayed on the display device 106 by the web search unit 152.

Next, the signal issue instruction unit 162 determines whether one of the device indications is selected or not (step S112). As described above, this selection is carried out, for example, by putting a cursor on one of the device indications. If one of the device indications is not selected (NO in step S112), the signal issue instruction unit 162 returns to step S112 and waits until one of the device indications is selected. Meanwhile, if one of the device indications is selected (YES in step S112), the signal issue instruction unit 162 instructs the device corresponding to the selected device indication to issue a signal (identification signal) that can be identified by the user (step S114). This instruction is carried out, for example, by transmitting a signal issue command to the device. Next, the communication establishing unit 164 determines whether an input to the effect that the selection of one of the device indications is decided is received or not (step S116). As described above, the input to the effect that the selection of one of the device indications is decided is carried out, for example, by a click on one of the device indications.

If the input to the effect that the selection of one of the device indications is decided is not received (NO in step S116), the signal issue instruction unit 162 determines whether the selection of one of the device indications in step S112 is canceled or not (step S118). This determination is carried out, for example, based on whether the cursor put on one of the device indications in step S112 has moved out of the device indication or not. If the selection of one of the device indications is canceled (YES in step S118), the signal issue instruction unit 162 returns to step S112 to repeat the processing. Meanwhile, if the selection of one of the device indications in step S112 is maintained (NO in step S118), the signal issue instruction unit 162 shifts the processing to step S116.

If the input to the effect that the selection of one of the device indications is decided is received in step S116 (YES in step S116), the communication establishing unit 164 establishes communication with the device corresponding to the selected device indication (step S120) and ends the processing. The connection sequence executed to establish this communication includes, for example, an input of an authentication code or the like for identifying the communication counterpart. The communication establishing unit 164 displays, on the display device 106, a message prompting the user to input data necessary for establishing communication, and an input box, following the connection sequence prescribed for the communication system used to communicate with the device. The communication establishing unit 164 thus acquires the necessary data.

Figure 3:
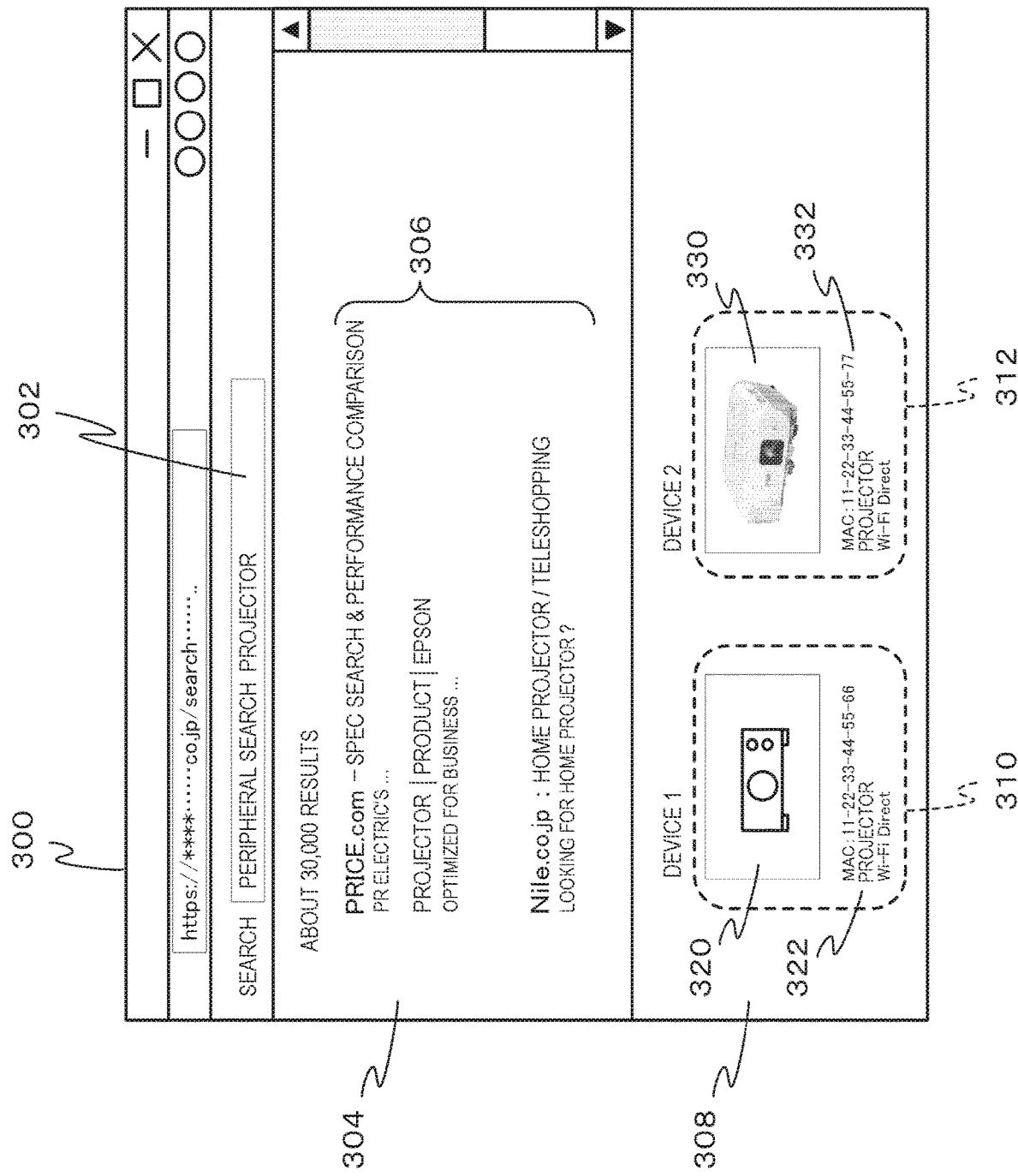
FIG. 3 shows an example of a device indication.

FIG. 3 shows an example of the device indication displayed on the display device 106. A display window 300 of a web browser displayed by the web search unit 152 includes an input box 302 for search text and a pane 304 as a main display area. If the user inputs, for example, a predetermined keyword "peripheral search" and a device name "projector" in the input box 302, the input acquisition unit 150 acquires the inputted character string "peripheral search projector" as input information.

Thus, processing such as device search, device extraction or device indication by the device search unit 154 or the like, for example, implemented as an add-in program, starts. The input acquisition unit 150 sends, for example, the "projector" of the input information excluding the predetermined keyword "peripheral search", to the web search unit 152. The web search unit 152 searches, for example, the world wide web for information associated with the "projector" and displays a search result 306 in the pane 304.

When the device search, device extraction or the like by the device search unit 154 or the like is carried out, the device display unit 160 provides a pane 308 as an additional display area in the display window 300, and displays device indications 310, 312 in the pane 308. The device indications 310, 312 are, for example, device indications of the devices 120, 122, respectively, corresponding to the device name "projector" included in the input information. The device display unit 160 displays the device indications, for example, in order from the highest radio wave intensity of the received response information, from the left to the right in the illustration, as the device indication 310 and the device indication 312. In the illustrated example, these device indications are given numbers in the form of "device 1" and "device 2".

The device indication 310 includes an image section 320 and a text section 322. The device indication 312 includes an image section 330 and a text section 332. The text sections 322, 332 respectively show a MAC address as the device identification information of the device 120 and the device 122, the device type "projector" acquired from the response information, and information of "Wi-Fi Direct" indicating the communication system used for communication.

It is now assumed, for example, that the response information received by the device search unit 154 from the device 120 does not include the model information of the device 120 and that the response information received from the device 122 includes the model information of the device 122. It is then assumed that the image search unit 158 has searched, for example, the world wide web and has acquired an image of the device 122.

In this case, the device display unit 160 displays the acquired image in the image section 330 of the device indication 312 of the device 122 whose image has been acquired. The device display unit 160 displays, for example, an icon indicating the function "projector" of the device 120 in the image section 320 of the device indication 310 of the device 120 whose image has not been acquired. Thus, the user can easily grasp that the device indication 312 represents the device 122 in reality, from the image shown in the image section 330 of the device indication 312. If the two of the device 120 and the device 122 are the only projectors on the periphery, the user can easily grasp that the device indication 310 represents the device 120 in reality. That is, the user can easily grasp the correspondence between the device indications 310, 312 and the devices 120, 122 and grasp which device indication represents a desired device.

If, for example, the user puts a cursor on the image section 320 of the device indication 310 or the image section 330 of the device indication 312 and thus selects one of the device indications 310, 312, the signal issue instruction unit 162 instructs the device 120 or 122 to issue an identification signal. Thus, the device 120 or 122 corresponding to the device indication 310 or 312 selected by a cursor put thereon issues an identification signal. The user can more easily grasp the correspondence between the device indications 310, 312 and the devices 120, 122.

By putting a cursor on the image section of the device indication of a desired device, for example, the image section 330 of the device indication 312 of the device 122, and for example, clicking the mouse, the user can carry out an input to the effect that the selection of the device indication 312 is decided. Thus, the communication establishing unit 164 starts executing the communication connection sequence to the device 122 corresponding to the device indication 312, on which the input to the effect that the selection is decided is carried out.

In the example of FIG. 3, the text sections 322, 332 forming the device indications 310, 312 are constantly displayed below the image sections 320, 330. However, this is not limiting. For example, the text sections 322, 332 may be configured not to be displayed constantly but to be displayed as a pop-up text that appears only when the user puts a cursor on the image sections 320, 330.

Figure 4:
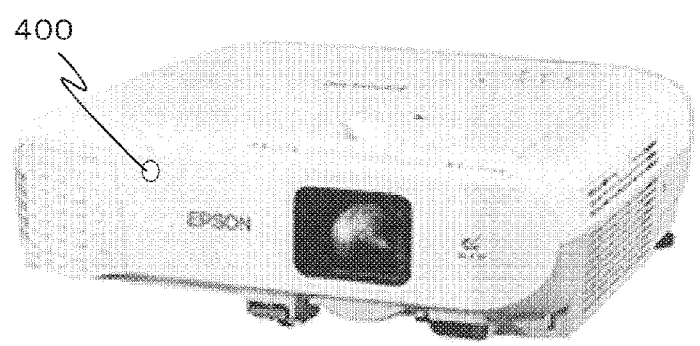
FIG. 4 shows an example of the configuration of a device.

FIG. 4 is an external view showing an example of the configuration of the device 122, which issues an identification signal in response to an instruction from the device search apparatus 100. As described above, the device 122 is, for example, a projector. The device 122 is provided with an LED 400 as a device which issues an identification signal (identification signal issue unit). As described above, for example, if the user selects the device indication 312 on the screen of FIG. 3, the device search apparatus 100 transmits a signal issue command to the device 122. In response to the reception of the signal issue command, the device 122 causes the LED 400 to light up or flash on and off, and/or changes the color of lighting, for example, from green to red. Thus, the user can easily specify the device 122 as the real device corresponding to the device indication 312.

While FIG. 4 shows the LED 400 as a device which issues an identification signal, this is not limiting. For example, a vibration motor as in a smartphone or the like may be provided as a device which issues an identification signal. Also, instead of providing an additional device such as an LED or vibration motor, for example, the number of rotations of a fan motor provided in the device may be periodically changed or the like, and a change in the vibration sound of the fan motor may be issued as an identification signal.

Figure 5:
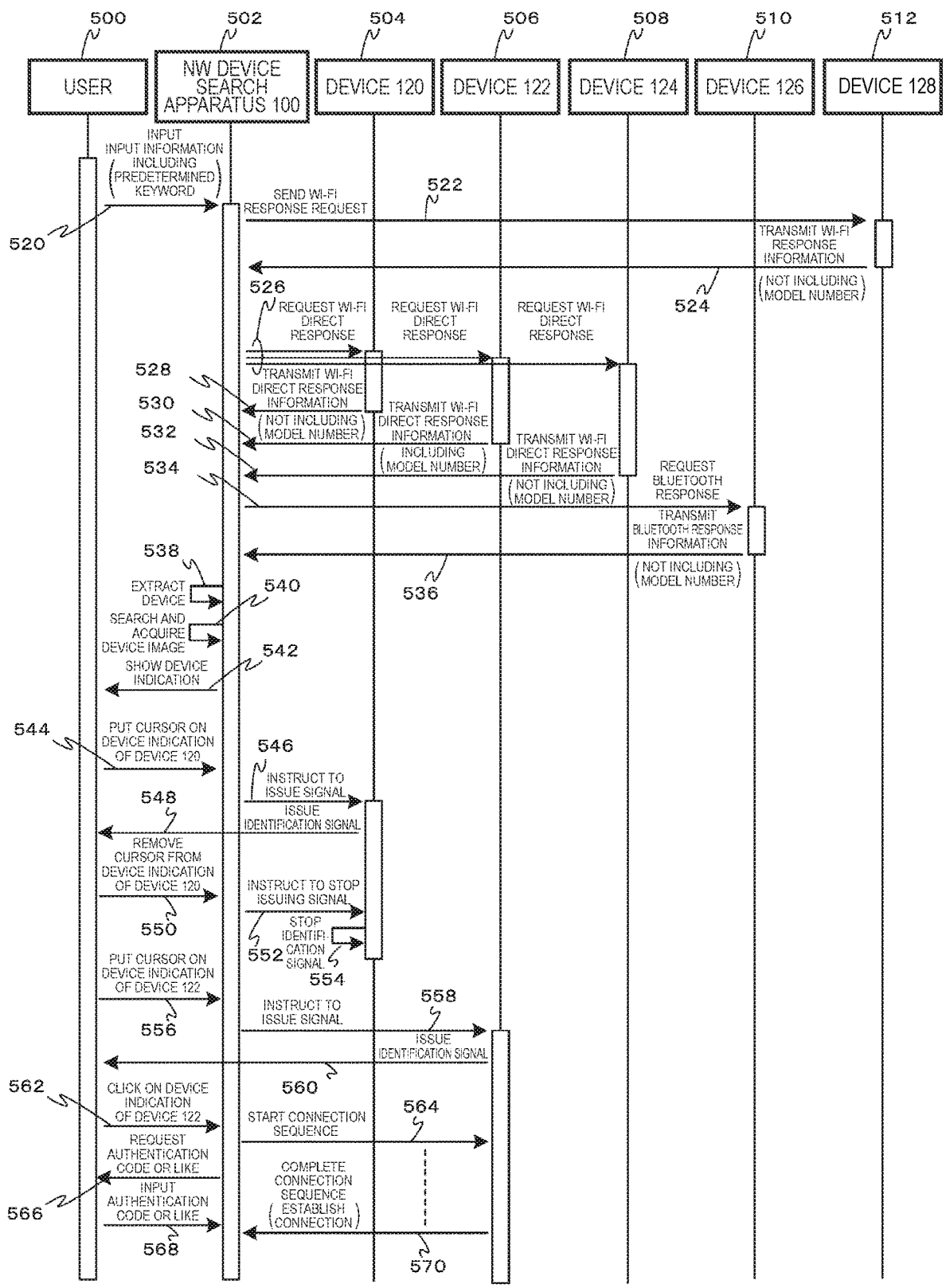
FIG. 5 is a sequence chart showing an example of operations of the device search apparatus.

FIG. 5 is a sequence chart showing an example of operations of the device search apparatus 100 shown in FIG. 1. FIG. 5 shows, from the left, objects 500, 502, 504, 506, 508, 510, and 512 representing the user, the device search apparatus 100, the device 120, the device 122, the device 124, the device 126, and the device 128.

FIG. 5 shows, for example, an example of operations to provide the device indications as shown in FIG. 3. First, if the user inputs input information including a predetermined keyword (arrow 520) to the device search apparatus 100, the device search unit 154 of the device search apparatus 100 searches for a device in the periphery, sequentially using all of the communication systems with which the communication device 104 can operate.

For example, the device search apparatus 100 first broadcasts a response request in conformity with the Wi-Fi standard via the device search unit 154 (arrow 522). In response to this, the device 128, which wirelessly communicates in conformity with the Wi-Fi standard, transmits response information to the device search apparatus 100 (arrow 524). At this point, it is assumed that the response information of the device 128 does not include the model number of the device.

Next, the device search apparatus 100 broadcasts a response request in conformity with Wi-Fi Direct via the device search unit 154 (three arrows 526). In response to this, each of the devices 120, 122, 124 wirelessly communicating in conformity with Wi-Fi Direct transmits response information to the device search apparatus 100 (arrows 528, 530, 532). At this point, the response information of the devices 120, 124 does not include the model numbers of the devices. Only the response information of the device 122 includes the model number of the device.

The device search apparatus 100 also broadcasts a response request in conformity with Bluetooth via the device search unit 154 (arrow 534). In response to this, the device 126 wirelessly communicating in conformity with Bluetooth transmits response information to the device search apparatus 100 (arrow 536). This response information does not include, for example, the model number of the device.

Next, the device search apparatus 100 extracts, via the device extraction unit 156, the devices 120, 122 having a function equivalent to the device name "projector" included in the input information, from among the devices 120 to 128 transmitting response information (arrow 538). Then, for the device 122 transmitting response information including a model number as model information, the device search apparatus 100 searches, via the image search unit 158, for example, the world wide web on the basis of the model number and acquires an image of a device of that model number (arrow 540).

Next, the device search apparatus 100 displays, via the device display unit 160, device indications of the extracted devices 120, 122 on the display device 106 to the user (arrow 542). In response to this, the user puts a cursor, for example, on the device indication of the device 120 and thus selects this device indication (arrow 544). In response to this, the device search apparatus 100 instructs the device 120 to issue an identification signal, via the signal issue instruction unit 162 (arrow 546). Thus, the device 120 starts issuing an identification signal to the user (arrow 548).

Subsequently, when the user moves the cursor out of the device indication of the device 120 (arrow 550), the selection of the device indication is canceled and the device search apparatus 100 instructs the device 120 to stop issuing the identification signal, via the signal issue instruction unit 162 (arrow 552). Thus, the device 120 stops issuing the identification signal to the user (arrow 554).

Subsequently, when the user puts a cursor, for example, on the device indication of the device 122 (arrow 556), the device search apparatus 100 instructs the device 122 to issue an identification signal, via the signal issue instruction unit 162 (arrow 558). Thus, the device 122 starts issuing an identification signal to the user (arrow 560).

When the user, in response to this, clicks on the device indication of the device 122 and thus selects this device indication (arrow 562), the device search apparatus 100 starts a communication connection sequence with the device 122 via the communication establishing unit 164 (arrow 564). In this connection sequence, for example, the device search apparatus 100 outputs, to the user, a message requesting the user to input a necessary authentication code to establish communication (or a device identification code such as PIN code), via the display device 106 (arrow 566). In response to this, the user inputs the requested authentication code or the like via the input device 108 (arrow 568). Finally, the device 122 transmits a communication authentication message or the like to the device search apparatus 100. This completes the connection sequence and establishes communication (arrow 570).

As described above, the device search apparatus 100 in this embodiment has: the communication device 104, which wireless communicates with a device; the input device 108, to which information is inputted; the display device 106, which displays information; and the processing device 102. The processing device 102 searches for a device, via the device search unit 154 and using the communication device 104, if input information including a predetermined keyword is received via the input device 108. The processing device 102 also extracts, via the device extraction unit 156, a device associated with a device name included in the input information, from among the devices detected by the search. The processing device 102 then displays a device indication representing each of the extracted devices on the display device 106, via the device display unit 160.

The device search apparatus 100 according to an embodiment of the invention and the device search apparatus 100 to which the device search method is applied enable the user to narrow down and easily specify, on the display device, a desired device with which to establish wireless connection for communication, from among devices existing on the periphery of the device search apparatus. Therefore, even a user with a low IT literacy level can easily connect to a desired wireless network device.

More specifically, the communication device 104 of the device search apparatus 100 has the function of wirelessly communicating by a plurality of different communication systems. The processing device 102 displays, on the display device 106, a device indication including an indication of a communication system used for communication with the extracted device, via the device display unit 160. This configuration enables the user to use, as a clue, the indication of communication system included in the device indication, and thus easily narrow down the device with which to establish connection for communication, from among the device indications displayed on the display device.

In the device search apparatus 100, the device search unit 154 of the processing device 102 acquires device information representing the model of the extracted device from the extracted device. The processing device 102 acquires an image of a device of the model specified by the acquired device information from an information source on a network via the image search unit 158. The processing device 102 then displays the device indication including the acquired image on the display device 106 via the device display unit 160. This configuration enables the user to more easily narrow down the device with which to establish connection for communication, from among the device indications displayed on the display device based on the image included in the device indication.

In the device search apparatus 100, when one of the device indications of the extracted devices is selected on the display screen of the display device 106, the processing device 102 instructs the device corresponding to the selected device indication to issue a signal that can be identified by the user. Here, the selection of one of the device indications is carried out, for example, by putting a cursor on the device indication of the extracted device.

This configuration can clarify the correspondence between the device indication and the actual device. Thus, the user can easily specify the device with which to establish connection for communication, from among the device indications displayed on the display device 106.

In the device search apparatus 100, the processing device 102 displays, on the display device 106 via the web search unit 152, a web browser for the user to search for information from an information source on a network via the communication device 104. The processing device 102 then displays the device indication on the display device 106, along with the information searched for from the information source on the network with respect to the device name included in the input information. This configuration enables the user to easily narrow down the device with which to establish connection for communication, from among the display indications displayed on the display device 106, also with reference to the information searched for from the information source on the network with respect to the device with which to establish connection for communication.

In the device search apparatus 100, when an input to the effect that selection of one of the device indications is decided is received via the input device 108, a connection sequence to connect for communication with the device corresponding to the device indication whose selection is decided is started via the communication establishing unit 164. This configuration enables the user to easily execute the decision of the device with which to establish connection for communication and the subsequent execution of the connection sequence to establish communication, as a series of processes, by a simple operation of deciding selection of the device indication (for example, a click on the device indication, or the like).

The embodiment represents one specific example to which the invention is applied. The invention is not limited to this embodiment.

For example, the program executed by the CPU of the processing device 102 is not limited to the program stored in the storage device such as ROM provided in the device search apparatus 100. For example, the program may be stored in another storage device, another storage medium, or a storage medium of an external device, and may be read and executed by the processing device 102. The functional units 150 to 164 formed in the processing device 102 in the embodiment are implemented by the collaboration of software and hardware. In this case, a single processor may execute a program to implement a plurality of functional units. Also, the processing device 102 may have hardware corresponding to each functional unit. Alternatively, apart of the functions implemented by software may be formed by hardware.

In the embodiment, for example, as shown in FIG. 3, the device indication 310 or the like is displayed in the pane 308, which is a part of the display area of the display window 300 on the web browser. However, this is not limiting. For example, the device display unit 160 may open another window over or next to the display window 300 on the web browser, and may display the device indication on that window.

In the embodiment, the device 128, which is an access point to the internet 140, has established connection for communication in advance. However, this is not limiting. For example, in the circumstance where connection to the internet 140 has not been established yet, the device search apparatus 100 can search for and connect to a device that serves as an access point, as in the operations with respect to the devices 120 to 126.

More specifically, for example, in response to an input of input information "peripheral search access point", the device search apparatus 100 can search for a device on the periphery in conformity with the Wi-Fi standard and display the device indication of the detected device on the display device 106. Then, in response to an input carried out by the user to the effect that the selection of one of the device indications is decided, the device search apparatus 100 can establish connection for communication with the device corresponding to the device indication whose selection is decided. Until connection for communication with the device serving as an access point is established, for example, a message such as "cannot connect to the internet" can be displayed in the search result display area on the web browser displayed by the web search unit 152.

The entire disclosure of Japanese Patent Application No. 2017-226533, filed Nov. 27, 2017 is expressly incorporated by reference herein.

What is claimed is:

1. A device search apparatus comprising:
   a communication device which wirelessly communicates with a device;
   an input device to which information is inputted by a user;
   a display device which displays information; and
   a processing device which, if input information inputted by the user via the input device includes a predetermined keyword:
     searches for a device, using the communication device,
     extracts a device associated with a device name included in the input information from among devices detected by the search, and
     displays a device indication representing each extracted device on the display device, wherein: the input information inputted by the user includes a character string, the character string includes the predetermined keyword, and the processing device initiates the search in response to determining that the character string includes the predetermined keyword, and extracts a device associated with a device name that is included in the character string excluding the predetermined keyword.

2. The device search apparatus according to claim 1, wherein:
the communication device has a function of wirelessly communicating by a plurality of different communication systems, and
the processing device displays, on the display device, the device indication including an indication of a communication system used for communication with the extracted device.

3. The device search apparatus according to claim 1, wherein
the processing device acquires device information representing a model of the extracted device from the extracted device, acquires an image of a device of the model specified by the acquired device information from an information source on a network, and displays the device indication including the acquired image on the display device.

4. The device search apparatus according to claim 1, wherein
when one of the device indications of the extracted devices is selected on a display screen of the display device, the processing device instructs the device corresponding to the selected device indication to issue a signal that is identified by the user.

5. The device search apparatus according to claim 1, wherein
the processing device
displays, on the display device, a web browser for the user to search for information from an information source on a network via the communication device, and
displays the device indication on the display device along with the information searched for from the information source on the network with respect to the device name included in the input information.

6. The device search apparatus according to claim 1, wherein
when an input indicating that selection of one of the device indications is decided is received via the input device, the processing device starts a connection sequence to connect for communication with a device corresponding to the device indication whose selection is decided.

7. A device search method executed by a device search apparatus, comprising:
receiving input information including a predetermined keyword from a user via an input device;
searching for a device;
extracting a device associated with a device name included in the received input information from among devices detected by the search; and
displaying a device indication representing each extracted device on the display device, wherein: the input information inputted by the user includes a character string, the character string includes the predetermined keyword, and the processing device initiates the search in response to determining that the character string includes the predetermined keyword, and extracts a device associated with a device name that is included in the character string excluding the predetermined keyword.

* * * * *